United States Patent
Nakada (10) Patent No.: US 10,260,442 B2
(45) Date of Patent: Apr. 16, 2019

(54) PLANT CONTROL DEVICE

(71) Applicant: Toyota Jidosha Kabushiki Kaisha, Toyota-shi Aichi-ken (JP)

(72) Inventor: Hayato Nakada, Yamanashi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/720,833

(22) Filed: Sep. 29, 2017

(65) Prior Publication Data

US 2018/0107177 A1    Apr. 19, 2018

(30) Foreign Application Priority Data

Oct. 17, 2016 (JP) .................. 2016-203623

(51) Int. Cl.
| | | |
|---|---|---|
| *F02D 41/14* | (2006.01) | |
| *G05B 13/04* | (2006.01) | |
| *F01N 3/035* | (2006.01) | |
| *G06F 17/13* | (2006.01) | |

(52) U.S. Cl.
CPC ......... *F02D 41/1406* (2013.01); *F01N 3/035* (2013.01); *F02D 41/1441* (2013.01); *G05B 13/04* (2013.01); *G05B 13/048* (2013.01); *G06F 17/13* (2013.01); *F02D 2041/1412* (2013.01); *F02D 2041/1433* (2013.01); *Y02T 10/144* (2013.01)

(58) Field of Classification Search
CPC ......... F02D 41/1406; F02D 2041/1412; F02D 2041/1433; F02D 41/1441; G05B 13/04; G05B 13/048

USPC ........................................................ 701/102
See application file for complete search history.

(56) References Cited

U.S. PATENT DOCUMENTS

| | | | | |
|---|---|---|---|---|
| 2012/0073268 | A1* | 3/2012 | Khadiya ................. | F01N 3/025 60/277 |
| 2015/0322871 | A1 | 11/2015 | Nakada | |
| 2015/0346704 | A1 | 12/2015 | Tabaru et al. | |
| 2015/0356413 | A1* | 12/2015 | Shimada ................ | G05B 11/36 706/46 |

FOREIGN PATENT DOCUMENTS

| | | | |
|---|---|---|---|
| JP | 2014-127083 A | 7/2014 | |
| JP | 2015-225635 A | 12/2015 | |
| JP | 2016-051196 A | 4/2016 | |
| JP | 2016-061188 A | 4/2016 | |
| WO | WO-2015178255 A1 * | 11/2015 | ......... F02D 41/0007 |
| WO | 2016/042399 A1 | 3/2016 | |

* cited by examiner

*Primary Examiner* — Mahmoud Gimie (74) *Attorney, Agent, or Firm* — Dinsmore & Shohl LLP (57) ABSTRACT

A plant control device includes a feedback controller that determines a control input of a plant, and a reference governor that corrects an initial target value and outputs the corrected initial target value to the feedback controller. The reference governor determines a target value satisfying an upper limit constraint to be a target value candidate that minimizes a value of an evaluation function. The reference governor determines the target value satisfying the upper limit constraint to be a value of the upper limit constraint when a value acquired by substituting, with the value of the upper limit constraint, a variable of a differential function acquired by differentiating the evaluation function with respect to the target value candidate is greater than or equal to zero.

4 Claims, 10 Drawing Sheets

PLANT CONTROL DEVICE

CROSS-REFERENCE TO RELATED APPLICATIONS

This application claims priority to Japanese Patent Application No. 2016-203623 filed on Oct. 17, 2016, the entire contents of which are incorporated herein by reference.

BACKGROUND

1. Technical Field

The present disclosure relates to a plant control device.

2. Description of Related Art

When a general plant control device is provided with a target value related to a control output of a plant, the plant control device determines a control input of a plant by feedback control that causes the control output to follow the target value. In actual plant control, various constraints in terms of hardware or control may exist with respect to the state quantity of the plant. When those constraints are not satisfied, hardware damage or a decrease in control performance may be generated. Constraint satisfaction is one type of significant performance demanded for plant control, like causing the control output to follow the target value.

One effective means for satisfying the constraints is exemplified by a reference governor. The reference governor includes a prediction model as a configuration that corrects the target value of the control output to be input into a feedback controller. The prediction model models a closed-loop system that includes the plant and the feedback controller. The reference governor predicts the future value of the state quantity of the plant by the prediction model. The reference governor corrects the target value of the control output based on the predicted future value and a constraint imposed on the future value.

In Japanese Unexamined Patent Application Publication No. 2016-61188 (JP 2016-61188 A), disclosed is a plant control device that applies a reference governor to control of a diesel engine which is a vehicle-mounted power plant. The reference governor includes a prediction model that models, as "dead time+secondary vibration system", a dynamic characteristic of a closed-loop system related to feedback control which causes the bed temperature of a diesel particulate filter (DPF) to follow a target value. In the reference governor, a value that is acquired by adding the current value of the bed temperature of the DPF to a variable (for example, $2\zeta\beta/\omega_n$) represented by using a damping factor $\zeta$ and a natural angular frequency $\omega_n$ of the prediction model and an upper limit constraint $\beta$ is calculated as a candidate of the target value of the bed temperature. In addition, in the reference governor, the target value of the bed temperature is corrected based on the calculated candidate.

In a general reference governor, the target value of the control output of the plant is corrected by narrowing down the candidates of the target value of the state quantity through an iterative calculation that uses the future value of the state quantity acquired by using the prediction model and the constraint. Meanwhile, in the reference governor, the candidates of the target value of the bed temperature are calculated by adding the current value of the bed temperature of the DPF to the variable including the damping factor $\zeta$ of the prediction model and the upper limit constraint $\beta$. That is, an iterative calculation is not performed in the reference governor at the time of correction of the target value. Accordingly, the plant control device can reduce calculation load on the correction of the target value in the reference governor.

SUMMARY

The plant control device assumes the prediction model that models the dynamic characteristic of the closed-loop system related to feedback control as "dead time+secondary vibration system". Thus, when the prediction model cannot be represented by "dead time+secondary vibration system", the target value may not be corrected. In addition, in the plant control device, the upper limit constraint $\beta$ is set for the amount of change of the bed temperature of the DPF per unit time, and no constraint is imposed on the bed temperature of the DPF. Thus, when a constraint is imposed on the bed temperature of the DPF, the iterative calculation is needed, thereby leading to an inevitable increase in calculation load on the correction of the target value. Accordingly, improvement is desired to achieve high versatility for the prediction model and to easily correct the target value of the state quantity of the plant with a constraint imposed on the state quantity.

The present disclosure provides a plant control device that can achieve high versatility for a prediction model and reduce calculation load on correction of a target value of a state quantity of a plant with a constraint imposed on the state quantity.

A first aspect of the present disclosure relates to a plant control device including a feedback controller configured to determine a control input of a plant at a time of input of a target value of a predetermined state quantity of the plant such that the state quantity follows the target value, and a reference governor configured to correct an initial target value of the state quantity at a time of input of the initial target value such that an upper limit constraint imposed on the state quantity is satisfied, and to output the corrected initial target value to the feedback controller. The reference governor is configured to set a target value satisfying the upper limit constraint to a target value candidate that is selected from target value candidates including the initial target value and that minimizes a value of a predetermined evaluation function. The evaluation function is represented by using a first term and a second term, the first term being configured to have a greater value in proportion to a square of a distance between the target value candidate and the initial target value, and the second term being configured to have a greater value in proportion to an amount of violation of the upper limit constraint by a future value of the state quantity. The future value of the state quantity is predicted by using an nth-order function model taking the target value candidate as a variable, where the n is a natural number. The reference governor is configured to set the target value satisfying the upper limit constraint to a value of the upper limit constraint, when a value acquired by substituting, with the value of the upper limit constraint, a variable of a differential function acquired by differentiating the evaluation function with respect to the target value candidate is greater than or equal to zero at a time of violation of the upper limit constraint by the initial target value.

In the first aspect, the nth-order function model may be a quintic or lower-order function model, and the reference governor may be configured to set the target value satisfying the upper limit constraint to a value of a horizontal axis intercept of the differential function drawn on a plane having the differential function as a vertical axis and the target value candidate as a horizontal axis, when the value acquired by substituting the variable of the differential function with the value of the upper limit constraint is smaller than zero at the time of violation of the upper limit constraint by the initial target value.

A second aspect of the present disclosure relates to a plant control device including a feedback controller configured to determine a control input of a plant at a time of input of a target value of a predetermined state quantity of the plant such that the state quantity follows the target value, and a reference governor configured to correct an initial target value of the state quantity at a time of input of the initial target value such that a lower limit constraint imposed on the state quantity is satisfied, and to output the corrected initial target value to the feedback controller. The reference governor is configured to set a target value satisfying the lower limit constraint to a target value candidate that is selected from target value candidates including the initial target value and that minimizes a value of a predetermined evaluation function. The evaluation function is represented by using a first term and a second term, the first term being configured to have a greater value in proportion to a square of a distance between the target value candidate and the initial target value, and the second term being configured to have a greater value in proportion to an amount of violation of the lower limit constraint by a future value of the state quantity. The future value of the state quantity is predicted by using an nth-order function model taking the target value candidate as a variable, where the n is a natural number. The reference governor is configured to set the target value satisfying the lower limit constraint to a value of the lower limit constraint, when a value acquired by substituting, with the value of the lower limit constraint, a variable of a differential function acquired by differentiating the evaluation function with respect to the target value candidate is smaller than or equal to zero at a time of violation of the lower limit constraint by the initial target value.

In the second aspect, the nth-order function model may be a quintic or lower-order function model, and the reference governor may be configured to set the target value satisfying the lower limit constraint to a value of a horizontal axis intercept of the differential function drawn on a plane having the differential function as a vertical axis and the target value candidate as a horizontal axis, when the value acquired by substituting the variable of the differential function with the value of the lower limit constraint is greater than zero at the time of violation of the lower limit constraint by the initial target value.

The first aspect can predict a predicted value of the state quantity by using the nth-order function model taking the target value candidate as a variable and thus, can increase versatility for a prediction model. In addition, the first aspect can determine the target value satisfying the upper limit constraint to be the value of the upper limit constraint, when the value acquired by substituting, with the value of the upper limit constraint, the variable of the differential function acquired by differentiating the evaluation function with respect to the target value candidate is greater than or equal to zero at the time of violation of the upper limit constraint by the initial target value input into the reference governor. That is, the first aspect may not use an iterative calculation when determining the target value. Accordingly, calculation load on the determination of the target value in the reference governor can be reduced.

The first aspect can determine the target value satisfying the upper limit constraint to be the value of the horizontal axis intercept of the differential function when the value is smaller than zero at a time of the nth-order function model being a quintic or lower-order function model. That is, the first aspect may not use an iterative calculation when determining the target value. Accordingly, the calculation load on the determination of the target value in the reference governor can be reduced.

The second aspect can predict a predicted value of the state quantity by using the nth-order function model taking the target value candidate as a variable and thus, can increase versatility for a prediction model. In addition, the second aspect can determine the target value satisfying the lower limit constraint to be the value of the lower limit constraint, when the value acquired by substituting, with the value of the lower limit constraint, the variable of the differential function acquired by differentiating the evaluation function with respect to the target value candidate is smaller than or equal to zero at the time of violation of the lower limit constraint by the initial target value input into the reference governor. That is, the second aspect may not use an iterative calculation when determining the target value. Accordingly, the calculation load on the determination of the target value in the reference governor can be reduced.

The second aspect can determine the target value satisfying the lower limit constraint to be the value of the horizontal axis intercept of the differential function when the value is greater than zero at a time of the nth-order function model being a quintic or lower-order function model. That is, the second aspect may not use an iterative calculation when determining the target value. Accordingly, the calculation load on the determination of the target value in the reference governor can be reduced.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments of the present disclosure will be described based on the drawings. Common elements in the drawings will be designated by the same reference signs and will be described once. The present disclosure is not limited by the following embodiments.

First Embodiment

First, a first embodiment of the present disclosure will be described with reference to FIG. 1 to FIG. 8.

Figure 1:
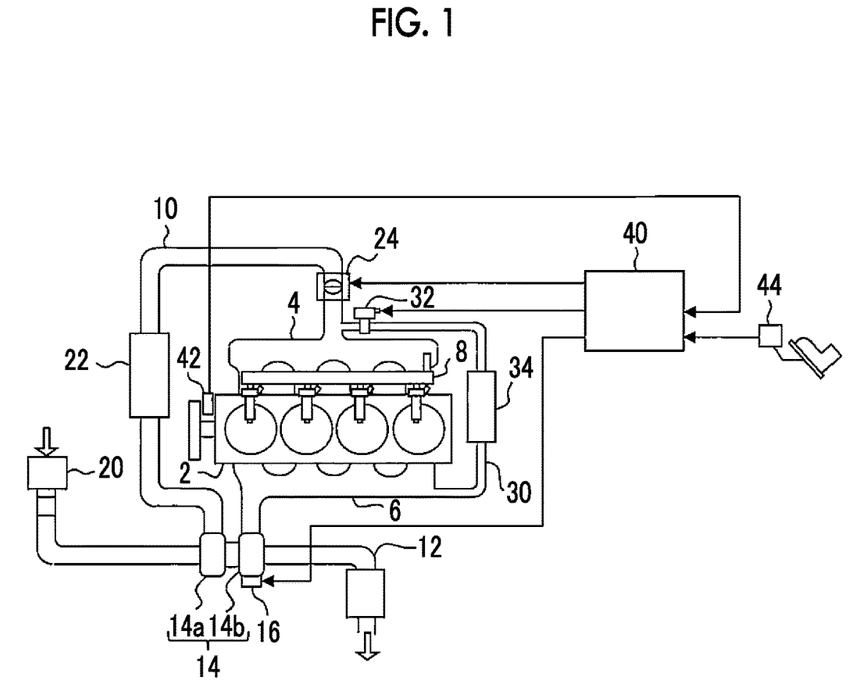
FIG. 1 is a diagram illustrating a configuration example of a turbocharger system to which a plant control device according to a first embodiment of the present disclosure is applied.

Description of System Configuration to Which Plant Control Device is Applied A plant control device of the first embodiment of the present disclosure is applied to a turbocharger system of a diesel engine that is a vehicle-mounted power plant. FIG. 1 is a diagram illustrating a configuration example of the turbocharger system to which the plant control device according to the first embodiment is applied. The turbocharger system illustrated in FIG. 1 includes a main body 2 of an in-line four-cylinder diesel engine. An intake manifold 4 and an exhaust manifold 6 are attached to the main body 2. High-pressure fuel is injected into each of the cylinders of the main body 2 through an injector connected to a common rail 8.

An intake path 10 in which air taken from an air cleaner 20 flows is connected to the intake manifold 4. A compressor 14a of a turbocharger 14 is attached to the intake path 10. An intercooler 22 is disposed downstream of the compressor 14a. A diesel throttle 24 is disposed downstream of the intercooler 22. An exhaust path 12 in which exhaust gas from the main body 2 flows is connected to the exhaust manifold 6. A turbine 14b of the turbocharger 14 is attached to the exhaust path 12. The turbocharger 14 is a variable-geometry turbocharger. A variable nozzle 16 is disposed in the turbine 14b.

The turbocharger system illustrated in FIG. 1 includes an exhaust gas recirculation (EGR) device that recirculates exhaust gas from an exhaust system to an intake system. The EGR device is a high-pressure loop EGR device that connects the intake path 10 on the downstream side of the diesel throttle 24 and the exhaust manifold 6 with an EGR path 30. An EGR valve 32 is disposed in the EGR path 30. The EGR device may be a low-pressure loop EGR device that connects the intake path 10 on the upstream side of the compressor 14a and the exhaust path 12 on the downstream side of the turbine 14b with a different EGR path from the EGR path 30.

Description of Configuration of Plant Control Device

An electronic control unit (ECU) 40 illustrated in FIG. 1 corresponds to the plant control device according to the first embodiment. The ECU 40 includes a random access memory (RAM), a read-only memory (ROM), a CPU (microprocessor), and the like. The ECU 40 acquires signals of various sensors mounted in a vehicle. Various sensors include a rotational speed sensor 42 that measures an engine rotational speed, an accelerator pedal operation amount sensor 44 that outputs a signal corresponding to the operation amount of an accelerator pedal, and the like. The ECU 40 processes the acquired signals of various sensors. The ECU 40 operates an actuator by causing the CPU to execute a predetermined control program stored in the RAM or the ROM. The actuator operated by the ECU 40 includes at least the variable nozzle 16. The predetermined control program includes at least an algorithm illustrated in FIG. 8.

Figure 10:
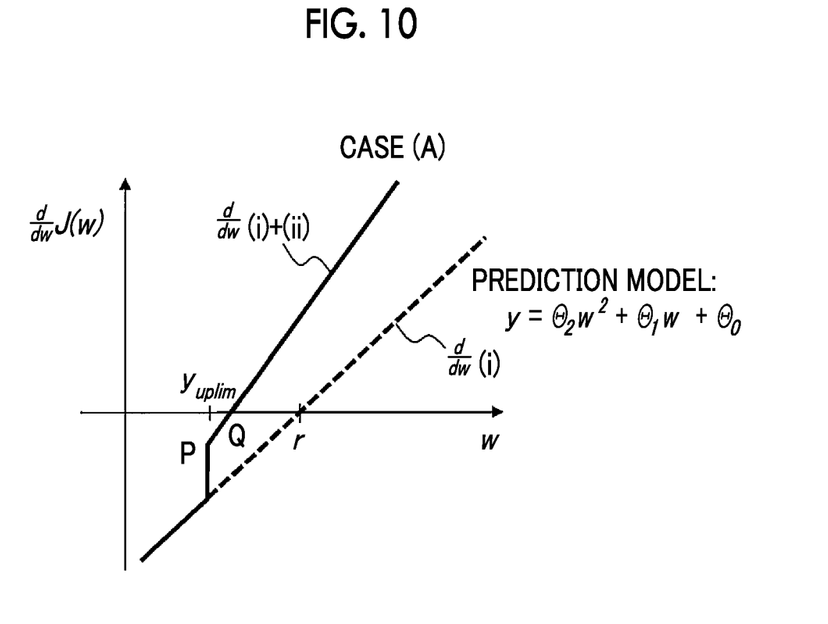
FIG. 10 is a diagram illustrating one example (case (A)) of a gradient acquired by adding the gradient of the second term (ii) on the right-hand side to the gradient of the first term (i) on the right-hand side illustrated in FIG. 9.

In the first embodiment, the ECU 40 executes feedback control (target value following control) of the boost pressure of the diesel engine. A control input u of the feedback control is the opening degree of the variable nozzle. A predetermined state quantity x of the diesel engine used in the feedback control is the actual boost pressure. The "actual boost pressure" is, for example, the intake pressure of the intake path 10 immediately downstream of the intercooler 22. A constraint in terms of hardware or control is imposed on the boost pressure that is a control output y of the feedback control. The constraint is not set as a limit value that the boost pressure should not strictly exceed, and is set in advance as a less strict value than the limit value.

In the feedback control of the first embodiment, the opening degree of the variable nozzle is determined such that the boost pressure as the control output y satisfies an upper limit constraint $y_{uplim}$ and that the actual boost pressure as the state quantity x follows a target value thereof. Details of the feedback control will be described with reference to FIG. 2 and FIG. 3. For convenience of description, hereinafter, the "boost pressure as the control output y on which the constraint is imposed" may be represented as a "boost pressure y", and the "actual boost pressure as the state quantity x" may be represented as an "actual boost pressure x".

Description of Feedback Control Structure

Figure 2:
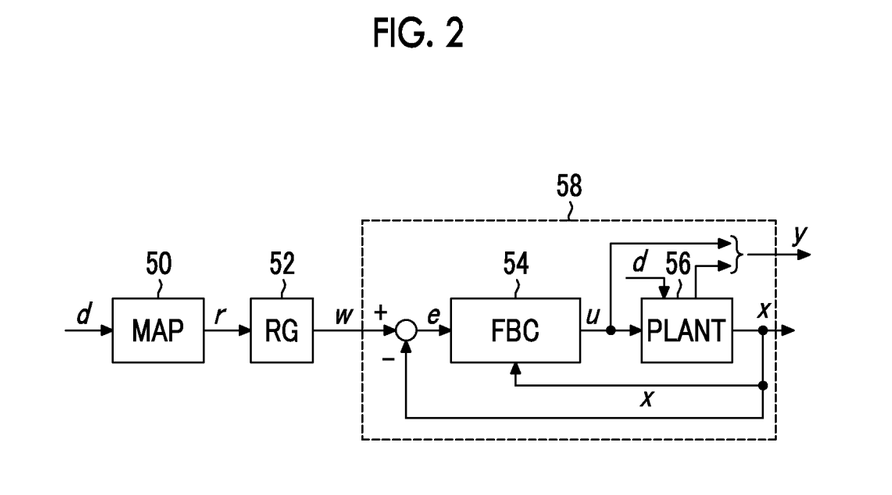
FIG. 2 is a diagram illustrating a feedback control structure of an ECU 40 illustrated in FIG. 1.

FIG. 2 is a diagram illustrating a feedback control structure of the ECU 40 illustrated in FIG. 1. The feedback control structure illustrated in FIG. 2 is a configuration that is virtually realized by causing the CPU to operate in accordance with the control program stored in the ROM of the ECU 40. The feedback control structure includes a target value map (MAP) 50, a reference governor (RG) 52, a feedback controller (FBC) 54, and a plant 56.

When the MAP 50 is provided with an extraneous input d that indicates an operating condition of the diesel engine, the MAP 50 outputs an initial target value r of the boost pressure to the RG 52. The extraneous input d includes an engine rotational speed and a fuel injection amount. These physical quantities included in the extraneous input d may be measured values or estimated values.

When the RG 52 is provided with the initial target value r of the boost pressure y from the MAP 50, the RG 52 corrects the initial target value r such that the upper limit constraint $y_{uplim}$, related to the boost pressure y is satisfied, and outputs the corrected initial target value r as a corrected target value w to the FBC 54. Details of the configuration of the RG 52 will be described later.

When the FBC 54 is provided with the corrected target value w from the RG 52, the FBC 54 determines the control input u such that the actual boost pressure x follows the corrected target value w. Specifications of the FBC 54 are not limited, and a known feedback controller can be used.

Figure 3:
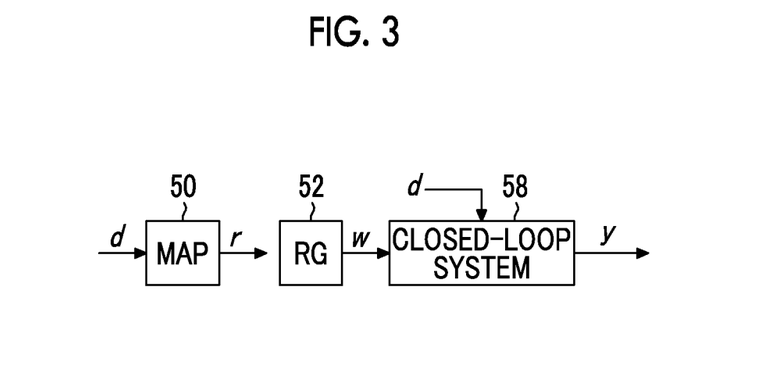
FIG. 3 is a diagram illustrating a feedforward control structure acquired by equivalent transformation of the feedback control structure illustrated in FIG. 2.

FIG. 3 is a diagram illustrating a feedforward control structure acquired by equivalent transformation of the feedback control structure illustrated in FIG. 2. A closed-loop system 58 surrounded by a broken line in FIG. 2 is previously designed and is described as one model in the feedforward structure illustrated in FIG. 3. The first embodiment assumes that a model of a closed-loop system (hereinafter, referred to as a "prediction model") is represented by a linear model. Then, the prediction model is described by General Formula (1) using the boost pressure y, the corrected target value w, and a model coefficient Θ (Θ>0).

$$y = \Theta w \quad (1)$$

Problem of Iterative Calculation by Reference Governor Algorithm

Figure 4:
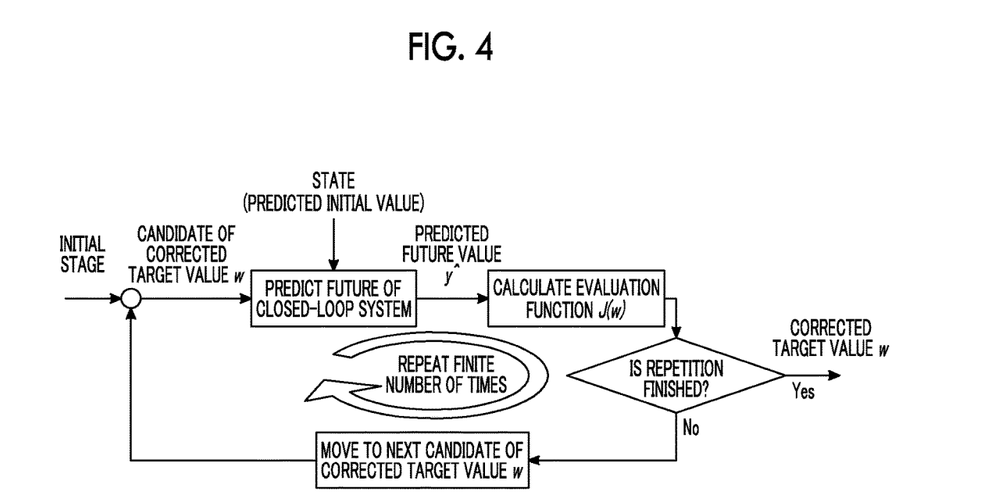
FIG. 4 is a diagram illustrating a general reference governor algorithm and a problem thereof.

FIG. 4 is a diagram illustrating a general reference governor algorithm and a problem thereof. In the algorithm illustrated in FIG. 4, prediction of a future value $\hat{y}$ of the control output y, calculation of an evaluation function J(w), movement to a next candidate of the corrected target value w are iterated a finite number of times for the candidate of the corrected target value w. Prediction of the future value $\hat{y}$ is performed by using, for example, a prediction model that is designed in advance in the same manner as the model described in General Formula (1). Calculation of the evaluation function J(w) is performed by using, for example, General Formula (2).

$$J(w) = \|r - w\|^2 + \rho \max\{\hat{y} - y_{up\ lim}, 0\} \quad (2)$$

The first term on the right-hand side of General Formula (2) is a function that takes the candidate of the corrected target value w as a variable. The function has a greater value as the distance between the initial target value r input into the RG 52 from the MAP 50 illustrated in FIG. 2 and the candidate of the corrected target value w is further. The second term on the right-hand side of General Formula (2) is a function that takes the future value $\hat{y}$ as a variable. The function adds a penalty to an objective function when the future value $\hat{y}$ violates the upper limit constraint $y_{uplim}$. The function takes zero when the future value $\hat{y}$ does not violate the upper limit constraint $y_{uplim}$, and has a greater value as the amount of violation of the upper limit constraint $y_{uplim}$ by the future value $\hat{y}$ is greater. A weighting constant $\rho (\rho > 0)$ that weights the penalty is set for the function.

The algorithm illustrated in FIG. 4 will be described in detail, assuming that the number of iterations of a series of operations illustrated in FIG. 4 is three. In this case, first, calculation of a future value $\hat{y}_1$ using the prediction model and calculation of an evaluation function $J(w_1)$ using the evaluation function J(w) as described in General Formula (2) are performed for a candidate $w_1$ of the corrected target value w (first calculation). The candidate $w_1$ is the initial target value r. When the first calculation is finished, a movement is made to a next candidate $w_2$ of the corrected target value w. Calculation of a future value $\hat{y}_2$ and calculation of an evaluation function $J(w_2)$ are performed for the candidate $w_2$ (second calculation). When the second calculation is finished, a movement is made to a next candidate $w_3$ of the corrected target value w. Calculation of a future value $\hat{y}_3$ and calculation of an evaluation function $J(w_3)$ are performed for the candidate $w_3$ (third calculation).

In the algorithm illustrated in FIG. 4, a final determination of the corrected target value w is performed in a stage where the number of iterations of the series of operations reaches the finite number. For example, when the number of iterations is three as described above, the minimum value of the three evaluation functions $J(w_1)$, $J(w_2)$, and $J(w_3)$ calculated in the iterations is selected. Next, the corrected target value w that is used in the calculation of the minimum value is finally determined as the corrected target value w. The determined corrected target value w is used in the feedback control. The method of searching for the minimum value of a function like the evaluation function J(w) is widely known as optimal solution search by gradient method.

The number of iterations of the series of operations poses a problem. Any number of iterations of the series can be set. Generally, as the number of iterations is greater, the possibility of being able to select more optimal corrected target value w is higher. However, when the number of iterations of the series is great, the amount of calculation for the selection of the corrected target value w is increased. In addition, the processing capability of the CPU of the ECU 40 illustrated in FIG. 1 is limited.

Features of First Embodiment

Figure 5:
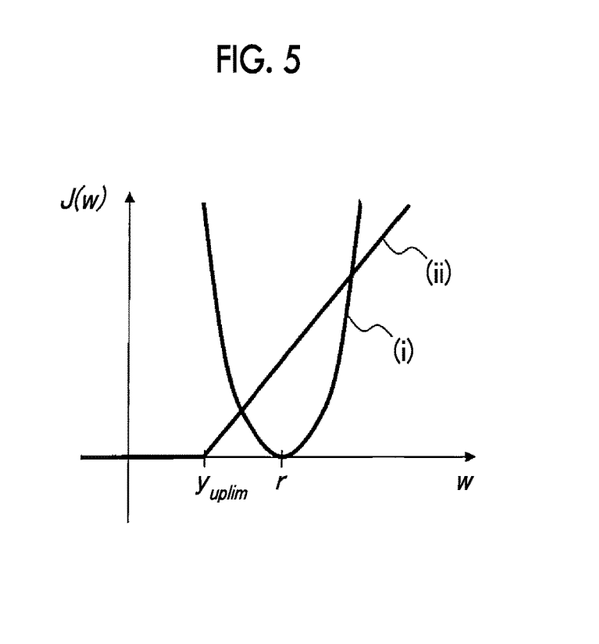
FIG. 5 is a diagram schematically illustrating an evaluation function J(w) represented in General Formula (2) on an xy plane having a corrected target value w as an x axis and the evaluation function J(w) as a y axis, with the evaluation function J(w) decomposed into the first term on the right-hand side and the second term on the right-hand side.

The first embodiment performs optimal solution search using a geometric structure of the gradients (derivative values) of each term of the evaluation function J(w) in order to decrease the amount of calculation for selection of the corrected target value w. FIG. 5 is a diagram schematically illustrating the evaluation function J(w) represented in General Formula (2) on an xy plane having the corrected target value w as an x axis and the evaluation function J(w) as a y axis, with the evaluation function J(w) decomposed into the first term on the right-hand side and the second term on the right-hand side. A part (i) of FIG. 5 corresponds to the first term on the right-hand side, and a part (ii) of FIG. 5 corresponds to the second term on the right-hand side. As illustrated in FIG. 5, the first term (i) on the right-hand side is represented as a quadratic curve with $J(w)=0$ when the corrected target value w is equal to the initial target value r. The second term (ii) on the right-hand side is represented as $J(w)=0$ when the corrected target value w is smaller than the upper limit constraint $y_{uplim}$, and is represented as $J(w)=\rho\Theta w-\rho\Theta y_{uplim}$ when the corrected target value w is greater than the upper limit constraint $y_{uplim}$.

In FIG. 5, the initial target value r has a value greater than the upper limit constraint $y_{uplim}$. The initial target value r being greater than the upper limit constraint $y_{uplim}$ means that the initial target value r is previously above the upper limit constraint $y_{uplim}$ in a stage where the initial target value r is input into the RG 52 from the MAP 50 illustrated in FIG. 2.

Figure 6:
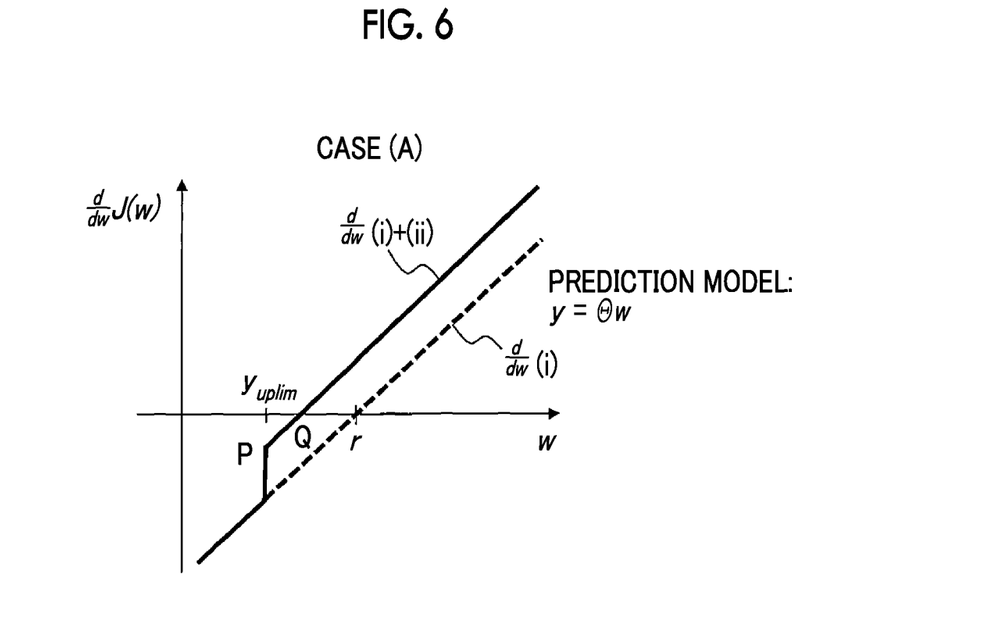
FIG. 6 is a diagram illustrating one example (case (A)) of a gradient acquired by adding the gradient of the second term (ii) on the right-hand side to the gradient of the first term (i) on the right-hand side illustrated in FIG. 5.
Figure 7:
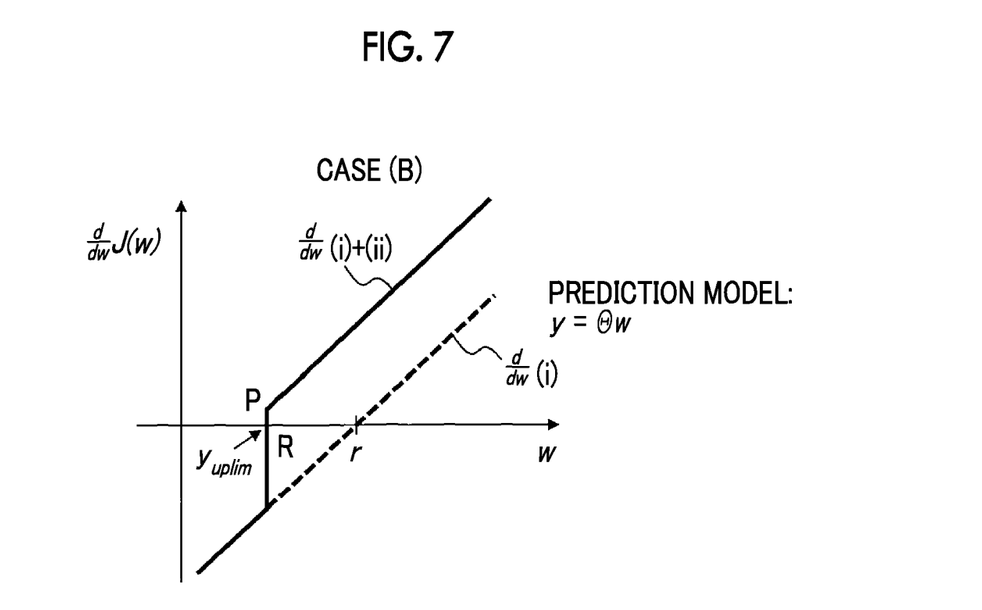
FIG. 7 is a diagram illustrating one example (case (B)) of the gradient acquired by adding the gradient of the second term (ii) on the right-hand side illustrated in FIG. 5 to the gradient of the first term (i) on the right-hand side illustrated in FIG. 5.

FIG. 6 is a diagram illustrating one example (case (A)) of a gradient acquired by adding the gradient of the second term (ii) on the right-hand side to the gradient of the first term (i) on the right-hand side illustrated in FIG. 5. FIG. 7 is a diagram illustrating one example (case (B)) of the gradient acquired by adding the gradient of the second term (ii) on the right-hand side illustrated in FIG. 5 to the gradient of the first term (i) on the right-hand side illustrated in FIG. 5. FIG. 6 and FIG. 7 are drawn as an xy plane having the corrected target value w as an x axis and a gradient $dJ(w)/dw$ of the evaluation function $J(w)$ as a y axis. Broken lines illustrated in FIG. 6 and FIG. 7 represent a relationship between the corrected target value w and a gradient $d(i)/dw$ of the first term (i) on the right-hand side. Solid lines illustrated in FIG. 6 and FIG. 7 represent a relationship between the corrected target value w and a gradient $d\{(i)+(ii)\}/dw$ acquired by adding a gradient $d(ii)/dw$ of the second term (ii) on the right-hand side to the gradient $d(i)/dw$.

As described above, the prediction model is described as a linear model in the first embodiment. In this case, the gradient $d(ii)/dw$ is as follows.

(1) corrected target value $w<$ upper limit constraint $y_{uplim}$: zero (2) corrected target value $w>$ upper limit constraint $y_{uplim}$: $\rho\Theta$ Accordingly, as illustrated in FIG. 6 and FIG. 7, the locus of the gradient $d\{(i)+(ii)\}/dw$ is divided as follows.

(1) In the region of corrected target value $w>$ upper limit constraint $y_{uplim}$: a straight line matching the gradient $d(i)/dw$ (2) corrected target value $w=$ upper limit constraint $y_{uplim}$: a line segment parallel to the y axis (3) In the region of corrected target value $w>$ upper limit constraint $y_{uplim}$: a straight line parallel to the gradient $d(i)/dw$ The width of the line segment when the locus of the gradient $d\{(i)+(ii)\}/dw$ is parallel to the y axis is equal to $\rho\Theta$. When the width of the line segment is small, a coordinate $P(y_{uplim}, 2y_{uplim}-2r+\rho\Theta)$ is positioned below the x axis as illustrated in FIG. 6. Conversely, when the width of the line segment is great, the coordinate $P(y_{uplim}, 2y_{uplim}-2r+\rho\Theta)$ is positioned above the x axis as illustrated in FIG. 7. Either way, cases are divided into a "case (A)" of FIG. 6 and a "case (B)" of FIG. 7 by the position of the coordinate $P(y_{uplim}, 2y_{uplim}-2r+\rho\Theta)$ with the x axis as a reference, and no other cases exist. The y-coordinate of the coordinate P is acquired based on the fact that the gradient $d(i)/dw$ is represented by $J(w)=2w-2r$ and that the width of the line segment is equal to $\rho\Theta$.

The evaluation function $J(w)$ has the minimum value when the gradient $dJ(w)/dw$ of the evaluation function $J(w)$ is equal to zero. That is, the evaluation function $J(w)$ has the minimum value when the gradient $d\{(i)+(ii)\}/dw$ illustrated in FIG. 6 or FIG. 7 is equal to zero, that is, when the corrected target value w is the x-axis intercept of the gradient $d\{(i)+(ii)\}/dw$. More specifically, in the "case (A)" of FIG. 6, the evaluation function $J(w)$ has the minimum value when the corrected target value w is equal to the x-coordinate value of a coordinate $Q(r-\rho\Theta/2, 0)$. In the "case (B)" of FIG. 7, the evaluation function $J(w)$ has the minimum value when the corrected target value w is equal to the x-coordinate value of a coordinate R(upper limit constraint $y_{uplim}$, 0). The x-coordinate of the coordinate Q is acquired as the x-axis intercept of a linear straight line having a slope of 2 and passing the coordinate $P(y_{uplim}, 2y_{uplim}-2r+\rho\Theta)$.

The first embodiment can acquire the corrected target value w where the evaluation function $J(w)$ has the minimum value, by dividing cases by the position of the coordinate $P(y_{uplim}, 2y_{uplim}-2r+\rho\Theta)$ with the x axis as a reference. That is, the optimal solution of the corrected target value w can be searched for without performing an iterative calculation as described in FIG. 4. Thus, the amount of calculation for selection of the corrected target value w is decreased, and calculation load of the CPU can be reduced.

Figure 8:
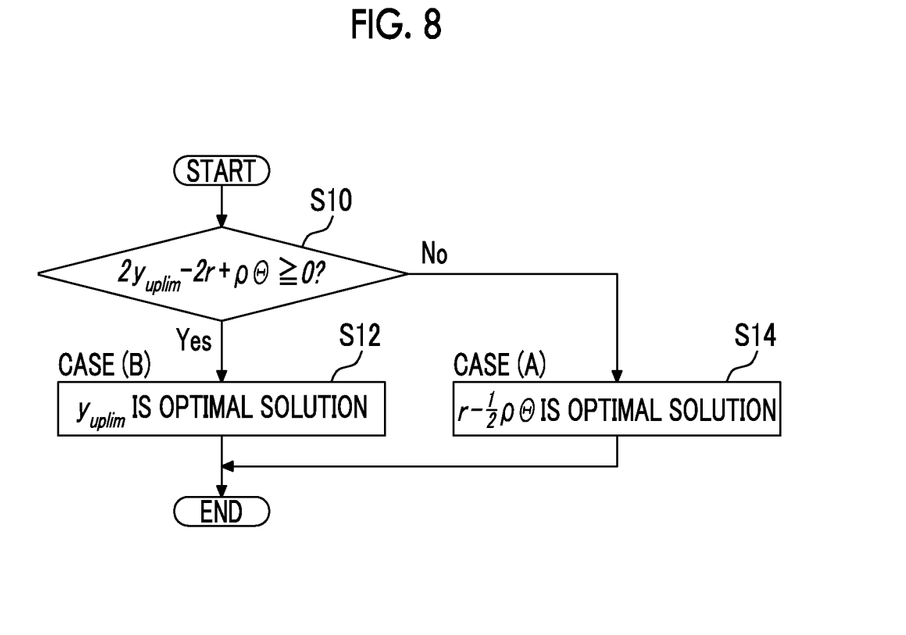
FIG. 8 is a diagram illustrating one example of a reference governor algorithm of the first embodiment of the present disclosure.

FIG. 8 is a diagram illustrating one example of a reference governor algorithm of the first embodiment. This algorithm is executed when the initial target value r calculated per predetermined control cycle (for example, per combustion cycle of each cylinder) is determined to be greater than or equal to the upper limit constraint $y_{uplim}$.

In the algorithm illustrated in FIG. 8, first, a determination as to whether or not $2y_{uplim}-2r+\rho\Theta\geq 0$ is established is performed (step S10). The process of the step is a determination as to whether or not the y-coordinate of the coordinate P illustrated in FIG. 6 and FIG. 7 is positioned above the x axis. When the determination result of step S10 is positive, the optimal solution of the corrected target value w is determined to be the upper limit constraint $y_{uplim}$ (step S12). The process of step S12 determines the x-coordinate of the coordinate R illustrated in FIG. 7 as the optimal solution of the corrected target value w. Meanwhile, when the determination result of step S10 is negative, the optimal solution of the corrected target value w is determined to be $r-\rho\Theta/2$ (step S14). The process of step S14 determines the x-coordinate of the coordinate Q illustrated in FIG. 6 as the optimal solution of the corrected target value w. The optimal solution of the corrected target value w determined in step S12 or step S14 is input into the FBC 54 illustrated in FIG. 2.

The algorithm illustrated in FIG. 8 can acquire the optimal solution of the corrected target value w by a simple "if-then-else" statement and intersection calculation. Accordingly, the calculation load of the CPU when the ECU 40 functions as a reference governor is minimized, and calculation resources can be saved.

Second Embodiment

Next, a second embodiment of the present disclosure will be described with reference to FIG. 9 to FIG. 12. A configuration of a plant control device of the second embodiment is basically the same as in the first embodiment. Thus, the configuration of the plant control device and a feedback control structure are described with appropriate reference to FIG. 2 and FIG. 3.

In the second embodiment, the model of the closed-loop system illustrated in FIG. 3 is described as, for example, a quadratic function model represented in General Formula (3) using the boost pressure y, the corrected target value w, and a model coefficient $\Theta_2$ ($\Theta_2$>0), $\Theta_1$, and $\Theta_0$.

$$y=\Theta_2 w^2+\Theta_1 w+\Theta_0 \qquad (3)$$

Features of Second Embodiment

Figure 9:
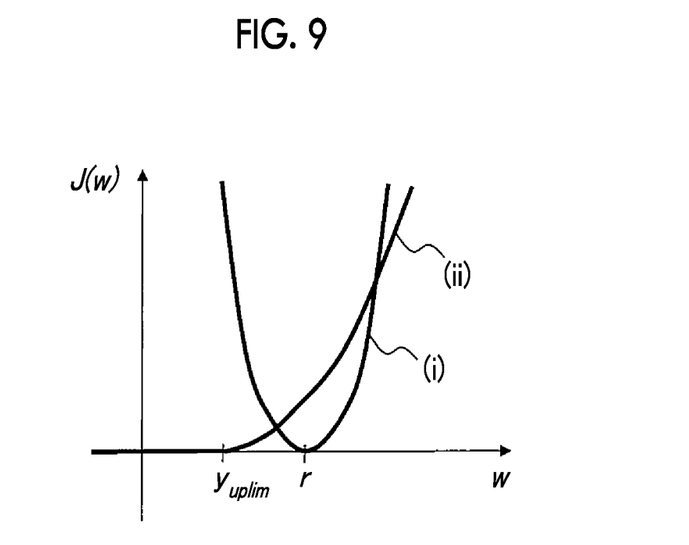
FIG. 9 is a diagram schematically illustrating an evaluation function J(w) represented in General Formula (2) on an xy plane having the corrected target value w as an x axis and the evaluation function J(w) as a y axis, with the evaluation function J(w) decomposed into the first term on the right-hand side and the second term on the right-hand side.

As in the first embodiment, the second embodiment performs optimal solution search using a geometric structure of the gradient of the evaluation function J(w). FIG. 9 is a diagram schematically illustrating the evaluation function J(w) represented in General Formula (2) on an xy plane having the corrected target value w as an x axis and the evaluation function J(w) as a y axis, with the evaluation function J(w) decomposed into the first term on the right-hand side and the second term on the right-hand side. A part (i) of FIG. 9 corresponds to the first term on the right-hand side, and a part (ii) of FIG. 9 corresponds to the second term on the right-hand side. As illustrated in FIG. 9, the first term (i) on the right-hand side is represented as a quadratic curve with J(w)=0 when the corrected target value w is equal to the initial target value r. The part heretofore is the same as in the first embodiment. The difference from the first embodiment is the second term (ii) on the right-hand side. That is, the second term (ii) on the right-hand side is represented as J(w)=0 when the corrected target value w is smaller than the upper limit constraint $y_{uplim}$, and is represented as J(w)= $\Theta_2 w^2+\Theta_1 w+\Theta_0-\rho\Theta y_{uplim}$ when the corrected target value w is greater than the upper limit constraint $y_{uplim}$.

Figure 11:
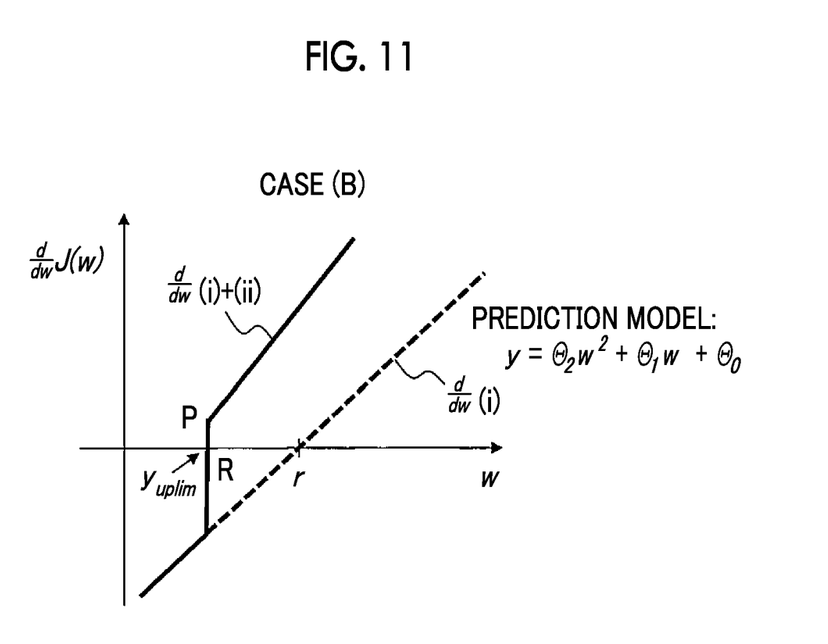
FIG. 11 is a diagram illustrating one example (case (B)) of the gradient acquired by adding the gradient of the second term (ii) on the right-hand side illustrated in FIG. 9 to the gradient of the first term (i) on the right-hand side illustrated in FIG. 9.

FIG. 10 is a diagram illustrating one example (case (A)) of a gradient acquired by adding the gradient of the second term (ii) on the right-hand side to the gradient of the first term (i) on the right-hand side illustrated in FIG. 9. FIG. 11 is a diagram illustrating one example (case (B)) of the gradient acquired by adding the gradient of the second term (ii) on the right-hand side illustrated in FIG. 9 to the gradient of the first term (i) on the right-hand side illustrated in FIG. 9. Types of lines illustrated in FIG. 10 and FIG. 11 are basically the same as in FIG. 6 and FIG. 7. That is, broken lines illustrated in FIG. 10 and FIG. 11 represent a relationship between the corrected target value w and the gradient d(i)/dw of the first term (i) on the right-hand side. Solid lines illustrated in FIG. 10 and FIG. 11 represent a relationship between the corrected target value w and the gradient d{(i)+(ii)}/dw acquired by adding the gradient d(ii)/dw of the second term (ii) on the right-hand side to the gradient d(i)/dw.

As described above, the prediction model is described as a quadratic function model in the second embodiment. In this case, the gradient d(ii)/dw is as follows.

(1) corrected target value w<upper limit constraint $y_{uplim}$: zero (2) corrected target value w>upper limit constraint $y_{uplim}$: $\rho(2\Theta_2 w+\Theta_1)$ Accordingly, as illustrated in FIG. 10 and FIG. 11, the locus of the gradient d{(i)+(ii)}/dw is divided as follows.

(1) In the region of corrected target value w<upper limit constraint $y_{uplim}$: a straight line matching the gradient d(i)/dw (2) corrected target value w=upper limit constraint $y_{uplim}$: a line segment parallel to the y axis (3) In the region of corrected target value w>upper limit constraint $y_{uplim}$: a straight line having a gradient greater than the gradient d(i)/dw The width of the line segment when the locus of the gradient d{(i)+(ii)}/dw is parallel to the y axis is equal to $\rho(2\Theta_2 y_{uplim}+\Theta_1)$. When the width of the line segment is small, a coordinate $P(y_{uplim}, 2y_{uplim}(1+\rho\Theta_2)-2r+\rho\Theta_1)$ is positioned below the x axis as illustrated in FIG. 10. Conversely, when the width of the line segment is great, the coordinate $P(y_{uplim}, 2y_{uplim}(1+\rho\Theta_2)-2r+\rho\Theta_1)$ is positioned above the x axis as illustrated in FIG. 11. Either way, cases are divided into a "case (A)" of FIG. 10 and a "case (B)" of FIG. 11 by the position of the coordinate $P(y_{uplim}, 2y_{uplim}(1+\rho\Theta_2)-2r+\rho\Theta_1)$ with the x axis as a reference, and no other cases exist. The y-coordinate of the coordinate P is acquired based on the fact that the gradient d(i)/dw is represented by J(w)=2w−2r and that the width of the line segment is equal to $2\rho\Theta_2 y_{uplim}+\rho\Theta_1$.

As described in the first embodiment, the evaluation function J(w) has the minimum value when the gradient dJ(w)/dw of the evaluation function J(w) is equal to zero. More specifically, in the "case (A)" of FIG. 10, the evaluation function J(w) has the minimum value when the corrected target value w is equal to the x-coordinate value of a coordinate $Q((2r-\rho\Theta_1)/2(1+\rho\Theta_2), 0)$. In the "case (B)" of FIG. 11, the evaluation function J(w) has the minimum value when the conected target value w is equal to the x-coordinate value of a coordinate R(upper limit constraint $y_{uplim}$, 0). The x-coordinate of the coordinate Q is acquired as the x-axis intercept of a linear straight line having a slope of $2(1+\rho\Theta_2)$ and passing the coordinate $P(y_{uplim}, 2Y_{uplim}(1+\rho\Theta_2)-2r+\rho\Theta_1)$.

The second embodiment can acquire the corrected target value w where the evaluation function J(w) has the minimum value as in the first embodiment, even when the prediction model is described as a quadratic function model. Thus, as in the first embodiment, the amount of calculation for selection of the corrected target value w is decreased, and the calculation load of the CPU can be reduced.

Figure 12:
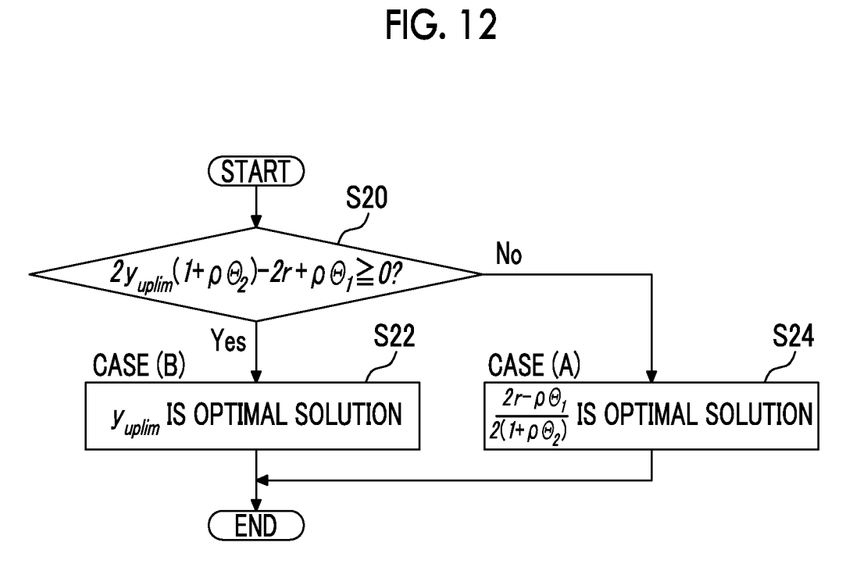
FIG. 12 is a diagram illustrating one example of a reference governor algorithm of a second embodiment of the present disclosure.

FIG. 12 is a diagram illustrating one example of a reference governor algorithm of the second embodiment. This algorithm is executed when the initial target value r calculated per predetermined control cycle is determined to be greater than or equal to the upper limit constraint $y_{uplim}$.

In the algorithm illustrated in FIG. 12, first, a determination as to whether or not $2y_{uplim}(1+\rho\Theta_2)-2r+\rho\Theta_1 \geq 0$ is established is performed (step S20). The process of the step is a determination as to whether or not the y-coordinate of the coordinate P illustrated in FIG. 10 and FIG. 11 is positioned above the x axis. When the determination result of step S20 is positive, the optimal solution of the corrected target value w is determined to be the upper limit constraint $y_{uplim}$ (step S22). The process of step S22 determines the x-coordinate of the coordinate R illustrated in FIG. 11 as the optimal solution of the corrected target value w. Meanwhile, when the determination result of step S20 is negative, the optimal solution of the corrected target value w is determined to be $(2r-\rho\Theta_1)/2(1+\rho\Theta_2)$ (step S24). The process of step S24 determines the x-coordinate of the coordinate Q illustrated in FIG. 10 as the optimal solution of the corrected target value w. The optimal solution of the corrected target value w determined in step S22 or step S24 is input into the FBC 54 illustrated in FIG. 2.

The algorithm illustrated in FIG. 12 can acquire the optimal solution of the corrected target value w by a simple "if-then-else" statement and intersection calculation even when the prediction model is described as a quadratic function model.

Third Embodiment

Next, a third embodiment of the present disclosure will be described with reference to FIG. 13 to FIG. 16. A configuration of a plant control device of the third embodiment is basically the same as in the first embodiment. Thus, the configuration of the plant control device and a feedback control structure are described with appropriate reference to FIG. 2 and FIG. 3.

As in the first embodiment, the model of the closed-loop system illustrated in FIG. 3 is described by a linear model represented in General Formula (1) in the third embodiment.

Features of Third Embodiment

In the first embodiment, an upper limit constraint in terms of hardware or control is imposed on the boost pressure. Meanwhile, in the third embodiment, a lower limit constraint in terms of hardware or control is imposed on the boost pressure. The evaluation function J(w) when the lower limit constraint is set is described by, for example, General Formula (4).

$$J(w)=\|r-w\|^2+\rho \max\{y_{lo\_lim}-\hat{y},0\} \quad (4)$$

The first term on the right-hand side of General Formula (4) is the same function as the first term on the right-hand side of General Formula (2). The second term on the right-hand side of General Formula (4) is a function that takes the future value $\hat{y}$ as a variable. The function adds a penalty to an objective function when the future value $\hat{y}$ violates a lower limit constraint $y_{lolim}$. The function takes zero when the future value $\hat{y}$ does not violate the lower limit constraint $y_{lolim}$, and has a greater value as the amount of violation of the lower limit constraint $y_{lolim}$ by the future value $\hat{y}$ is greater. The weighting constant $\rho(\rho>0)$ that weights the penalty is set for the function.

Figure 13:
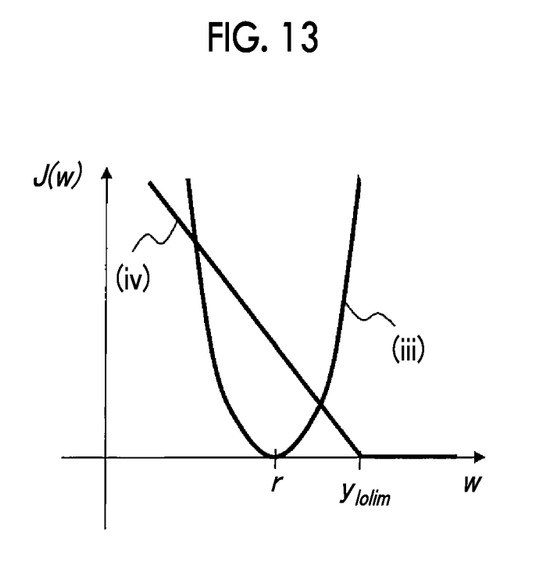
FIG. 13 is a diagram schematically illustrating the evaluation function J(w) represented in General Formula (4) on an xy plane having the corrected target value w as an x axis and the evaluation function J(w) as a y axis, with the evaluation function J(w) decomposed into the first term on the right-hand side and the second term on the right-hand side.

FIG. 13 is a diagram schematically illustrating the evaluation function J(w) represented in General Formula (4) on an xy plane having the corrected target value w as an x axis and the evaluation function J(w) as a y axis, with the evaluation function J(w) decomposed into the first term on the right-hand side and the second term on the right-hand side. A part (iii) of FIG. 13 corresponds to the first term on the right-hand side, and a part (iv) of FIG. 13 corresponds to the second tenor on the right-hand side. As illustrated in FIG. 13, the first term (iii) on the right-hand side is represented as a quadratic curve with J(w)=0 when the corrected target value w is equal to the initial target value r. The part heretofore is the same as in the first embodiment. The difference from the first embodiment is the second term (iv) on the right-hand side. That is, the second term (iv) on the right-hand side is represented as J(w)=0 when the corrected target value w is greater than the lower limit constraint $y_{lolim}$, and is represented as $J(w)=\rho\Theta y_{lolim}-\rho\Theta w$ when the corrected target value w is smaller than the lower limit constraint $y_{lolim}$.

In FIG. 13, the initial target value r has a value smaller than the lower limit constraint $y_{lolim}$. The initial target value r being smaller than the lower limit constraint $y_{lolim}$ means that the initial target value r is previously below the lower limit constraint $y_{lolim}$ in a stage where the initial target value r is input into the RG 52 from the MAP 50 illustrated in FIG. 2.

Figure 14:
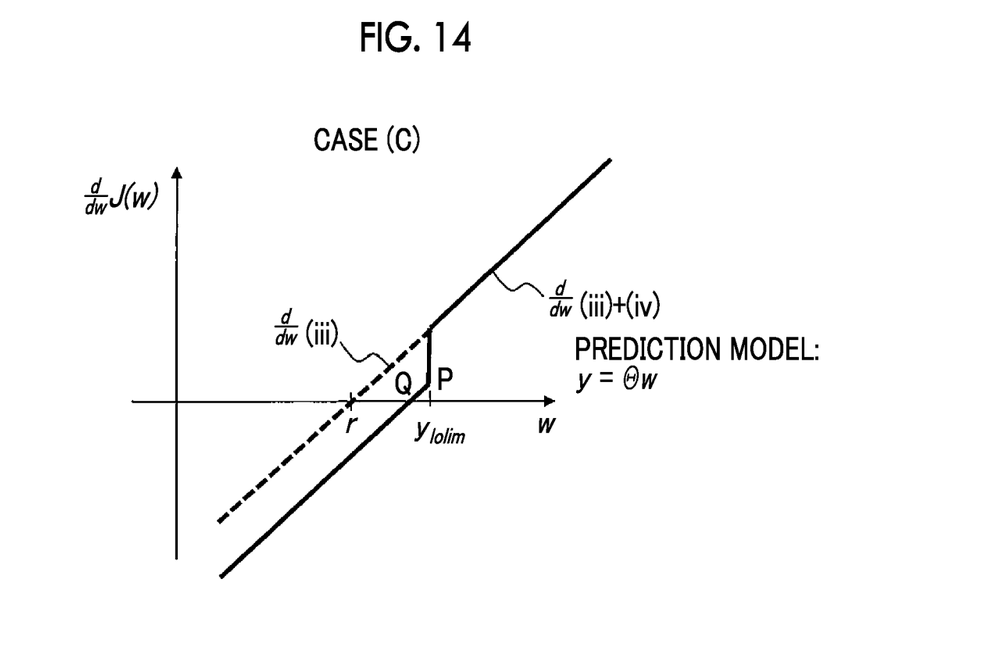
FIG. 14 is a diagram illustrating one example (case (C)) of a gradient acquired by adding the gradient of the second term (iv) on the right-hand side to the gradient of the first term (iii) on the right-hand side illustrated in FIG. 13.
Figure 15:
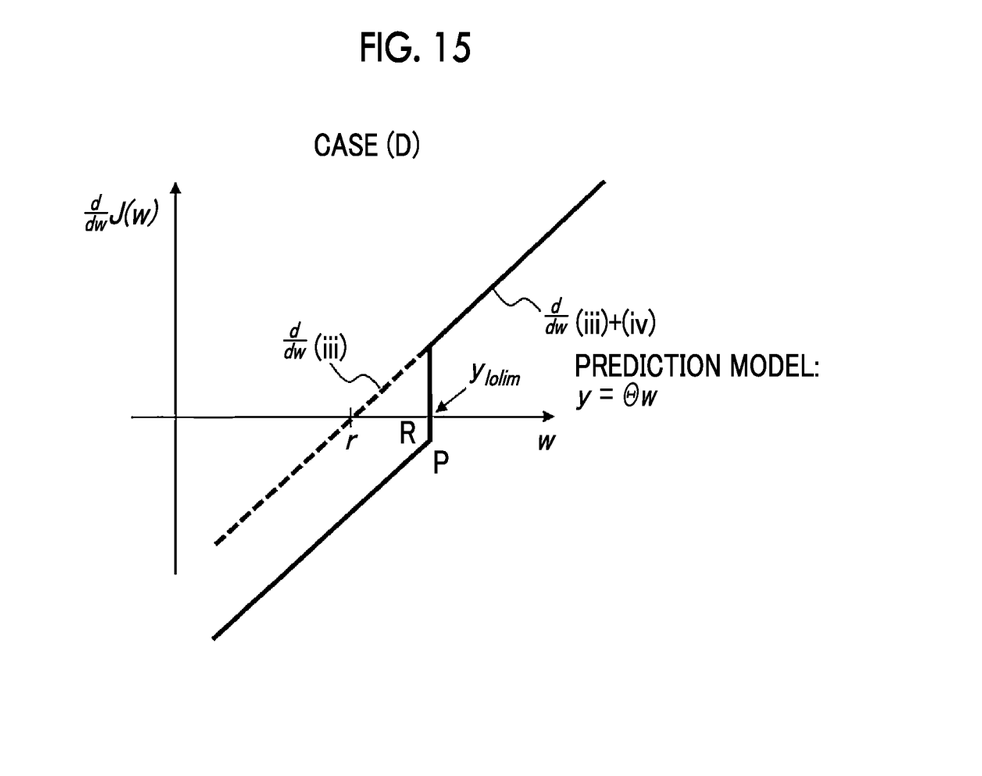
FIG. 15 is a diagram illustrating one example (case (D)) of the gradient acquired by adding the gradient of the second term (iv) on the right-hand side illustrated in FIG. 13 to the gradient of the first term (iii) on the right-hand side illustrated in FIG. 13.

FIG. 14 is a diagram illustrating one example (case (C)) of a gradient acquired by adding the gradient of the second term (iv) on the right-hand side to the gradient of the first term (iii) on the right-hand side illustrated in FIG. 13. FIG. 15 is a diagram illustrating one example (case (D)) of the gradient acquired by adding the gradient of the second term (iv) on the right-hand side illustrated in FIG. 13 to the gradient of the first term (iii) on the right-hand side illustrated in FIG. 13. FIG. 14 and FIG. 15 are drawn as an xy plane having the corrected target value w as an x axis and the gradient dJ(w)/dw of the evaluation function J(w) as a y axis. Broken lines illustrated in FIG. 14 and FIG. 15 represent a relationship between the corrected target value w and a gradient d(iii)/dw of the first term (iii) on the right-hand side. Solid lines illustrated in FIG. 14 and FIG. 15 represent a relationship between the corrected target value w and a gradient d{(iii)+(iv)}/dw acquired by adding a gradient d(iv)/dw of the second term (iv) on the right-hand side to the gradient d(iii)/dw.

As described above, the prediction model is described as a linear model in the third embodiment. In this case, the gradient d(iv)/dw is as follows.

(1) corrected target value w<lower limit constraint $y_{lolim}$: $-\rho\Theta$ (2) corrected target value w>lower limit constraint $y_{lolim}$: zero Accordingly, as illustrated in FIG. 14 and FIG. 15, the locus of the gradient d{(iii)+(iv)}/dw is divided as follows.

(1) In the region of corrected target value w>lower limit constraint $y_{lolim}$: a straight line matching the gradient d(iii)/dw (2) corrected target value w=lower limit constraint $y_{lolim}$: a line segment parallel to the y axis (3) In the region of corrected target value w<lower limit constraint $y_{lolim}$: a straight line parallel to the gradient d(iii)/dw The width of the line segment when the locus of the gradient d{(iii)+(iv)}/dw is parallel to the y axis is equal to $\rho\Theta$. When the width of the line segment is small, a coordinate $P(y_{lolim}, 2y_{lolim}-2r-\rho\Theta)$ is positioned above the x axis as illustrated in FIG. 14. Conversely, when the width of the line segment is great, the coordinate $P(y_{lolim}, 2y_{lolim}-2r-\rho\Theta)$ is positioned below the x axis as illustrated in FIG. 15. The y-coordinate of the coordinate P is acquired based on the fact that the gradient d(iii)/dw is represented by J(w)=2w−2r and that the width of the line segment is equal to $\rho\Theta$.

As described in the first embodiment, the evaluation function J(w) has the minimum value when the gradient dJ(w)/dw of the evaluation function J(w) is equal to zero. That is, the evaluation function J(w) has the minimum value when the gradient d{(iii)+(iv)}/dw illustrated in FIG. 14 or FIG. 15 is equal to zero, that is, when the corrected target value w is the x-axis intercept of the gradient d{(iii)+(iv)}/dw. More specifically, in the "case (C)" of FIG. 14, the evaluation function J(w) has the minimum value when the corrected target value w is equal to the x-coordinate value of a coordinate Q(r+$\rho\Theta$/2,0). In the "case (D)" of FIG. 15, the evaluation function J(w) has the minimum value when the corrected target value w is equal to the x-coordinate value of a coordinate R(lower limit constraint $y_{lolim}$,0). The x-coordinate of the coordinate Q is acquired as the x-axis intercept of a linear straight line having a slope of 2 and passing the coordinate $P(y_{lolim}, 2y_{lolim}-2r-\rho\Theta)$.

The third embodiment can acquire the corrected target value w where the evaluation function J(w) has the minimum value as in the first embodiment, even when a lower limit constraint is imposed on the boost pressure. Thus, as in the first embodiment, the amount of calculation for selection of the corrected target value w is decreased, and the calculation load of the CPU can be reduced.

Figure 16:
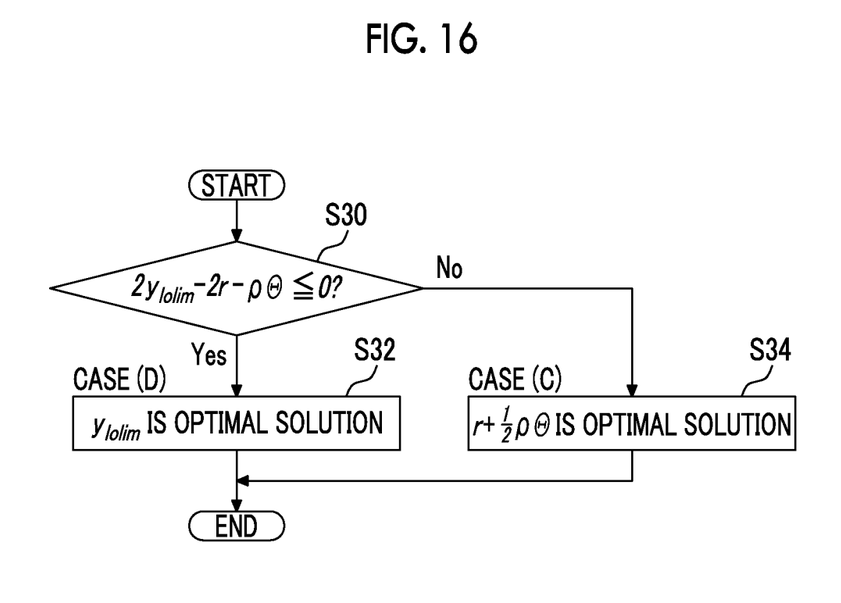
FIG. 16 is a diagram illustrating one example of a reference governor algorithm of a third embodiment of the present disclosure.

FIG. 16 is a diagram illustrating one example of a reference governor algorithm of the third embodiment. This algorithm is executed when the initial target value r calculated per predetermined control cycle is determined to be smaller than or equal to the lower limit constraint $y_{lolim}$.

In the algorithm illustrated in FIG. 16, first, a determination as to whether or not $2y_{lolim}-2r-\rho\Theta \leq 0$ is established is performed (step S30). The process of the step is a determination as to whether or not the y-coordinate of the coordinate P illustrated in FIG. 14 and FIG. 15 is positioned above the x axis. When the determination result of step S30 is positive, the optimal solution of the corrected target value w is determined to be the lower limit constraint $y_{lolim}$ (step S32). The process of step S32 determines the x-coordinate of the coordinate R illustrated in FIG. 15 as the optimal solution of the corrected target value w. Meanwhile, when the determination result of step S30 is negative, the optimal solution of the corrected target value w is determined to be $r+\rho\Theta/2$ (step S34). The process of step S34 determines the x-coordinate of the coordinate Q illustrated in FIG. 14 as the optimal solution of the corrected target value w. The optimal solution of the corrected target value w determined in step S32 or step S34 is input into the FBC 54 illustrated in FIG. 2.

The algorithm illustrated in FIG. 16 can acquire the optimal solution of the corrected target value w by a simple "if-then-else" statement and intersection calculation even when the lower limit constraint $y_{lolim}$ is imposed on the boost pressure y.

Fourth Embodiment

Next, a fourth embodiment of the present disclosure will be described with reference to FIG. 17. A configuration of a plant control device of the fourth embodiment is basically the same as in the first embodiment. Thus, the configuration of the plant control device and a feedback control structure are described with appropriate reference to FIG. 2 and FIG. 3.

As in the second embodiment, the model of the closed-loop system illustrated in FIG. 3 is described by, for example, a quadratic function model represented in General Formula (3) in the fourth embodiment. In addition, as in the third embodiment, the lower limit constraint $y_{lolim}$ in terms of hardware or control is imposed on the boost pressure y in the fourth embodiment.

Features of Fourth Embodiment

As described in the second embodiment, the corrected target value w where the evaluation function J(w) has the minimum value can be acquired even when the prediction model is described by a quadratic function model. In addition, as described in the third embodiment, the corrected target value w where the evaluation function J(w) has the minimum value can be acquired even when the lower limit constraint $y_{lolim}$ is imposed on the boost pressure y. Thus, even when the prediction model is described by a quadratic function model with the lower constraint $y_{lolim}$ imposed on the boost pressure y as in the fourth embodiment, the corrected target value w where the evaluation function J(w) has the minimum value can be acquired.

Figure 17:
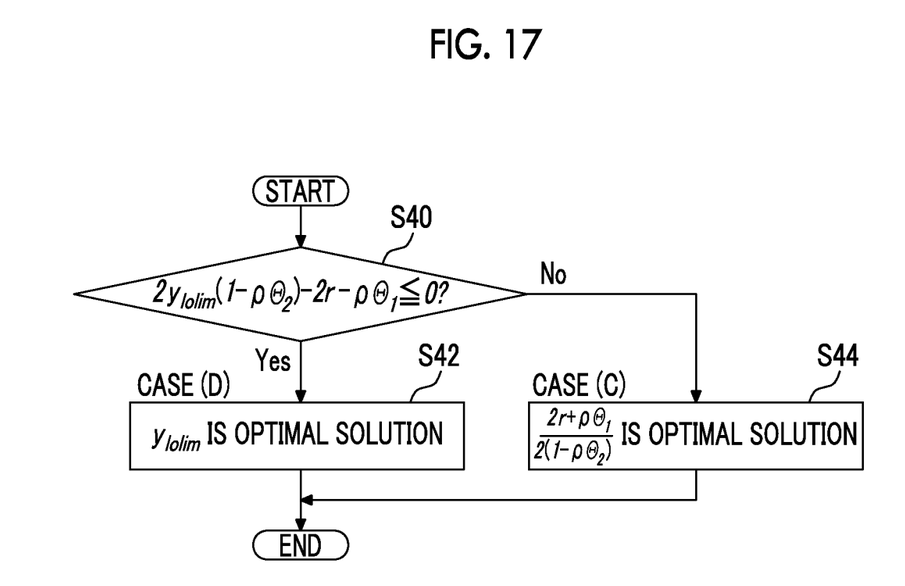
FIG. 17 is a diagram illustrating one example of a reference governor algorithm of a fourth embodiment of the present disclosure.

FIG. 17 is a diagram illustrating one example of a reference governor algorithm of the fourth embodiment. This algorithm is executed when the initial target value r calculated per predetermined control cycle is determined to be smaller than or equal to the lower limit constraint $y_{lolim}$.

In the algorithm illustrated in FIG. 17, first, a determination as to whether or not $2y_{lolim}(1-\rho\Theta_2)-2r-\rho\Theta_1 \leq 0$ is established is performed (step S40). When the determination result of step S40 is positive, the optimal solution of the corrected target value w is determined to be the lower limit constraint $y_{lolim}$ (step S42). Meanwhile, when the determination result of step S40 is negative, the optimal solution of the corrected target value w is determined to be $(2r+\rho\Theta_1)/2(1-\rho\Theta_2)$ (step S44). The optimal solution of the corrected target value w determined in step S42 or step S44 is input into the FBC 54 illustrated in FIG. 2.

The algorithm illustrated in FIG. 17 can acquire the optimal solution of the corrected target value w by a simple "if-then-else" statement and intersection calculation even when the prediction model is described by a quadratic function model with the lower limit constraint $y_{lolim}$ imposed on the boost pressure y.

Others

The first and third embodiments describe the prediction model as a linear model (that is, a linear function model), and the second and fourth embodiments describe the prediction model as a quadratic function model. However, the prediction model may be described by a cubic or higher-order function model. As understood from the use of the coordinate P at the time of acquiring the x-coordinate value of the coordinate Q illustrated in FIG. 6, FIG. 10, and FIG. 14 and the use of the gradient d(ii)/dw at the time of acquiring the coordinates of the coordinate P, acquisition of the x-coordinate value of the coordinate Q uses a formula for the solution of a differential function acquired by differentiating the prediction model with respect to the connected target value w. Since a formula for the solution of a quintic equation does not exist, the prediction model is desirably described by a quintic or lower-order function model in order for the differential function to be a quartic or lower-order function, if calculation of the x-coordinate value of the coordinate Q is assumed.

The x-coordinate value of the coordinate R illustrated in FIG. 7, FIG. 11, and FIG. 15 can be specified by a simple "if-then-else" statement even when the prediction model is described by a sextic or higher-order function model. In this case, the iterative calculation in accordance with the general reference governor algorithm described in FIG. 4 is used at the time of acquiring the x-coordinate value of the coordinate Q. That is, if the y-coordinate value of the coordinate P is greater than or equal to zero when the upper limit constraint $y_{uplim}$ is set, the x-coordinate value of the coordinate R, that is, the upper limit constraint $y_{uplim}$, is determined to be the optimal solution of the corrected target value w. Otherwise, the x-coordinate value of the coordinate Q may be determined by the iterative calculation. If the y-coordinate value of the coordinate P is smaller than or equal to zero when the lower limit constraint $y_{lolim}$ is set, the x-coordinate value of the coordinate R, that is, the lower limit constraint $y_{lolim}$, is determined to be the optimal solution of the corrected target value w. Otherwise, the x-coordinate value of the coordinate Q may be determined by the iterative calculation. From the viewpoint heretofore, a sextic or higher-order function model can be applied as the prediction model of the present disclosure.

Figure 18:
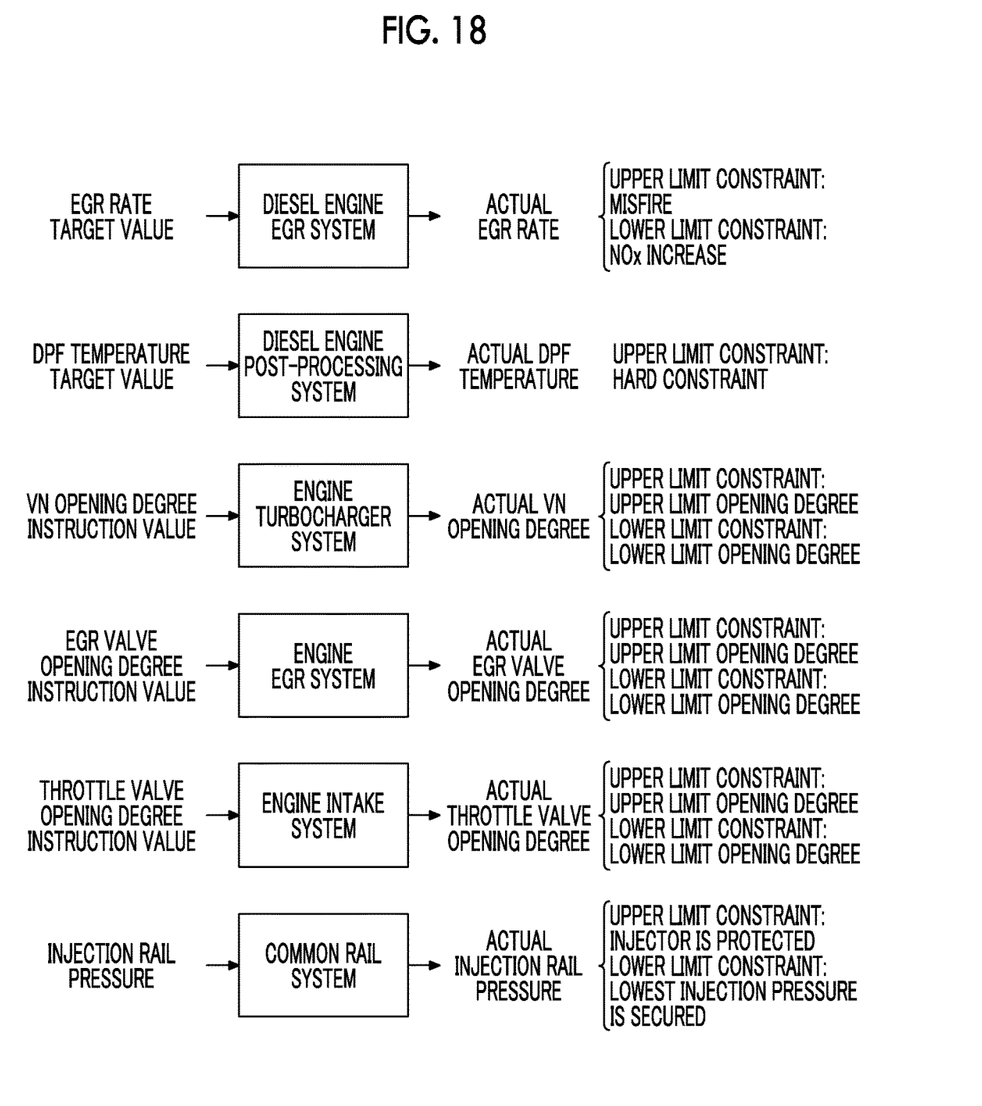
FIG. 18 is a diagram illustrating a plant to which the feedback control structure illustrated in FIG. 2 can be applied, a control output on which a constraint is imposed, and a combination example of a state quantity of the plant and a constraint.

While the first to fourth embodiments describe the turbocharger system of the diesel engine as an application target, feedback control can be performed as in the first to fourth embodiments for any plant of which a predetermined state quantity can be predicted by using an nth-order function model (n is a natural number) taking the target value candidate as a variable. FIG. 18 is a diagram illustrating a plant to which the feedback control structure illustrated in FIG. 2 can be applied, a control output on which a constraint is imposed, and a combination example of a predetermined state quantity of the plant and a constraint. In the first example of FIG. 18, the plant is an EGR system of a diesel engine, the control output on which an upper limit constraint or a lower limit constraint is imposed is an EGR rate, and the predetermined state quantity is the actual EGR rate. In the second example, the plant is a post-processing system of a diesel engine, the control output on which an upper limit constraint is imposed is the temperature of a DPF, and the predetermined state quantity is the actual temperature of the DPF. In the third example, the plant is a turbocharger system of an engine, the control output on which an upper limit constraint or a lower limit constraint is imposed is a VN opening degree (the opening degree of a variable nozzle), and the predetermined state quantity is the actual VN opening degree. In the fourth example, the plant is an EGR system of an engine, the control output on which an upper limit constraint or a lower limit constraint is imposed is an EGR valve opening degree, and the predetermined state quantity is the actual EGR valve opening degree. In the fifth example, the plant is an intake system of an engine, the control output on which an upper limit constraint or a lower limit constraint is imposed is a throttle valve opening degree, and the predetermined state quantity is the actual throttle valve opening degree. In the sixth example, the plant is a common rail system, the control output on which an upper limit constraint or a lower limit constraint is imposed is an injection rail pressure, and the predetermined state quantity is the actual injection rail pressure.

What is claimed is:

1. A plant control device for controlling an engine system of a vehicle, the plant control device comprising:
a feedback controller configured to determine a control input of the engine system of the vehicle at a time of input of a target value of a predetermined state quantity of the engine system of the vehicle such that the state quantity follows the target value; and
a reference governor configured to correct an initial target value of the state quantity at a time of input of the initial target value such that an upper limit constraint imposed on the state quantity is satisfied, and to output the corrected initial target value to the feedback controller, wherein:
the reference governor is configured to set a target value satisfying the upper limit constraint to a target value candidate that is selected from target value candidates including the initial target value and that minimizes a value of a predetermined evaluation function;
the evaluation function is represented by using a first term and a second term, the first term being configured to have a greater value in proportion to a square of a distance between the target value candidate and the initial target value, and the second term being configured to have a greater value in proportion to an amount of violation of the upper limit constraint by a future value of the state quantity;
the future value of the state quantity is predicted by using an nth-order function model taking the target value candidate as a variable, where the n is a natural number; and
the reference governor is configured to set the target value satisfying the upper limit constraint to a value of the upper limit constraint, when a value acquired by substituting, with the value of the upper limit constraint, a variable of a differential function acquired by differentiating the evaluation function with respect to the target value candidate is greater than or equal to zero at a time of violation of the upper limit constraint by the initial target value.

2. The plant control device according to claim 1, wherein:
the nth-order function model is a quintic or lower-order function model; and
the reference governor is configured to set the target value satisfying the upper limit constraint to a value of a horizontal axis intercept of the differential function drawn on a plane having the differential function as a vertical axis and the target value candidate as a horizontal axis, when the value acquired by substituting the variable of the differential function with the value of the upper limit constraint is smaller than zero at the time of violation of the upper limit constraint by the initial target value.

3. A plant control device for controlling an engine system of a vehicle, the plant control device comprising:
a feedback controller configured to determine a control input of the engine system of the vehicle at a time of input of a target value of a predetermined state quantity of the engine system of the vehicle such that the state quantity follows the target value; and
a reference governor configured to correct an initial target value of the state quantity at a time of input of the initial target value such that a lower limit constraint imposed on the state quantity is satisfied, and to output the corrected initial target value to the feedback controller, wherein:
the reference governor is configured to set a target value satisfying the lower limit constraint to a target value candidate that is selected from target value candidates including the initial target value and that minimizes a value of a predetermined evaluation function;
the evaluation function is represented by using a first term and a second term, the first term being configured to have a greater value in proportion to a square of a distance between the target value candidate and the initial target value, and the second term being configured to have a greater value in proportion to an amount of violation of the lower limit constraint by a future value of the state quantity;
the future value of the state quantity is predicted by using an nth-order function model taking the target value candidate as a variable, where the n is a natural number; and
the reference governor is configured to set the target value satisfying the lower limit constraint to a value of the lower limit constraint, when a value acquired by substituting, with the value of the lower limit constraint, a variable of a differential function acquired by differentiating the evaluation function with respect to the target value candidate is smaller than or equal to zero at a time of violation of the lower limit constraint by the initial target value.

4. The plant control device according to claim 3, wherein:
the nth-order function model is a quintic or lower-order function model; and
the reference governor is configured to set the target value satisfying the lower limit constraint to a value of a horizontal axis intercept of the differential function drawn on a plane having the differential function as a vertical axis and the target value candidate as a horizontal axis, when the value acquired by substituting the variable of the differential function with the value of the lower limit constraint is greater than zero at the time of violation of the lower limit constraint by the initial target value.

* * * * *

UNITED STATES PATENT AND TRADEMARK OFFICE
CERTIFICATE OF CORRECTION

PATENT NO. : 10,260,442 B2
APPLICATION NO. : 15/720833
DATED : April 16, 2019
INVENTOR(S) : Hayato Nakada It is certified that error appears in the above-identified patent and that said Letters Patent is hereby corrected as shown below:

In the Specification

In Column 7, Line 30, after "constraint $y_{uplim}$" delete ",".

In Column 9, Line 46-47, delete "w>upper limit constraint $y_{uplim}$" and insert --w<upper limit constraint $y_{uplim}$--, therefor.

In Column 13, Line 27, delete "constraint$y_{lolim}$." and insert --constraint $y_{lolim}$.--, therefor.

In Column 16, Line 25, delete "connected" and insert --corrected--, therefor.

Signed and Sealed this
Eleventh Day of June, 2019

Andrei Iancu
*Director of the United States Patent and Trademark Office*